US008891610B2

(12) United States Patent
Ngo et al.

(10) Patent No.: US 8,891,610 B2
(45) Date of Patent: Nov. 18, 2014

(54) METHOD AND SYSTEM FOR CHROMA PARTITIONING AND RATE ADAPTATION FOR UNCOMPRESSED VIDEO TRANSMISSION IN WIRELESS NETWORKS

(75) Inventors: Chiu Ngo, San Francisco, CA (US); Huai-Rong Shao, San Jose, CA (US); Ju-Lan Hsu, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 876 days.

(21) Appl. No.: 13/027,509

(22) Filed: Feb. 15, 2011

(65) Prior Publication Data

US 2011/0273622 A1 Nov. 10, 2011

Related U.S. Application Data

(60) Provisional application No. 61/331,662, filed on May 5, 2010.

(51) Int. Cl.
| | | |
|---|---|---|
| H04N 7/12 | (2006.01) | |
| H04N 11/02 | (2006.01) | |
| H04N 11/04 | (2006.01) | |
| H04N 7/01 | (2006.01) | |
| H04N 11/20 | (2006.01) | |
| H04N 7/18 | (2006.01) | |
| H04N 21/61 | (2011.01) | |
| H04N 21/4363 | (2011.01) | |

(52) U.S. Cl.
CPC ....... H04N 21/4363 (2013.01); H04N 21/6131 (2013.01)
USPC .......... 375/240.01; 348/446; 725/81

(58) Field of Classification Search
USPC ....................................................... 348/663
See application file for complete search history.

(56) References Cited

U.S. PATENT DOCUMENTS

| 7,992,177 B2 * | 8/2011 | Perry et al. ............... 725/81 |
|---|---|---|
| 2004/0028129 A1 | 2/2004 | Nagumo et al. |

(Continued)

FOREIGN PATENT DOCUMENTS

| JP | 2003348620 A | 12/2003 |
|---|---|---|
| JP | 2006304198 A | 11/2006 |
| JP | 2010045853 A | 2/2010 |

OTHER PUBLICATIONS

International Search Report and Written Opinion dated Dec. 23, 2011 for International Application No. PCT/KR2011/002900 from Korean Intellectual Property Office, pp. 1-10, Seo-gu, Daejeon, Republic of Korea.

Hitachi, Ltd. et al., "High-Definition Multimedia Interface Specification Version 1.4", HDMI Licensing, LLC, Jun. 5, 2009, pp. i-ii and 109-116, United States.

(Continued)

*Primary Examiner* — Hee-Yong Kim
(74) *Attorney, Agent, or Firm* — Kenneth L. Sherman, Esq.; Michael Zarrabian, Esq.; Sherman & Zarrabian LLP

(57) ABSTRACT

A method and system for transmission of video information is provided. A transmitting wireless station performs chroma partitioning of pixels in a video frame into different partitions. The chroma partitioning includes separating luminance (Y) information from chrominance information ($C_B$ and $C_R$) of each pixel in a set of spatially correlated pixels. The luminance (Y) information are placed into different partitions. The different partitions into different packets and transmitted over a wireless communication medium to a receiving wireless station. The video information is selectively adapted to a lower data transmission rate with reduced quality degradation by dropping less important partitions.

53 Claims, 13 Drawing Sheets

(56) References Cited

U.S. PATENT DOCUMENTS

2008/0130741 A1* 6/2008 Chiang et al. ............ 375/240.01
2008/0181304 A1 7/2008 Sekiguchi et al.
2010/0265392 A1* 10/2010 Shao et al. .................... 348/446

OTHER PUBLICATIONS

Broadcom Corporation et al., "WirelessHD Specification Revision 1.1", WirelessHD, LLC, Apr. 8, 2010, pp. i-ii and 453-468, United States.

* cited by examiner

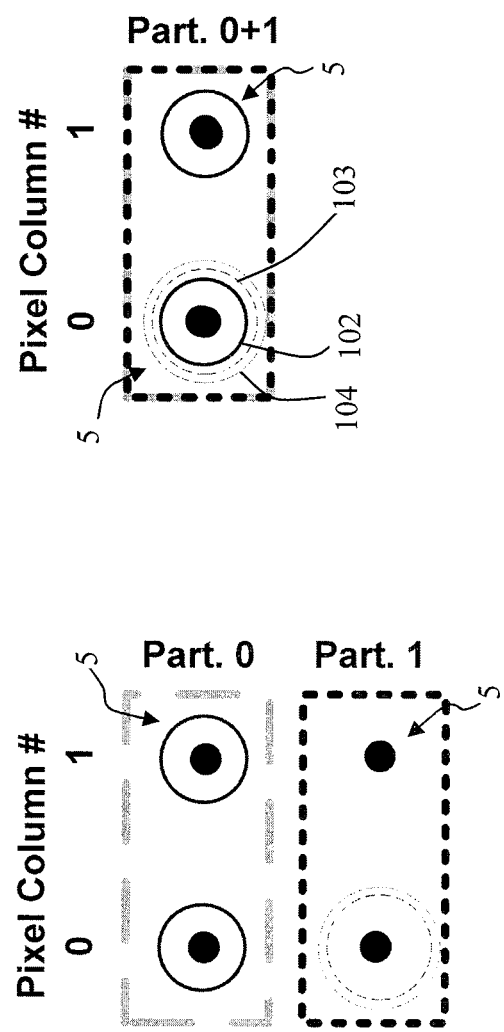

METHOD AND SYSTEM FOR CHROMA PARTITIONING AND RATE ADAPTATION FOR UNCOMPRESSED VIDEO TRANSMISSION IN WIRELESS NETWORKS

RELATED APPLICATION

This application claims priority from U.S. Provisional Patent Application Ser. No. 61/331,662 filed on May 5, 2010, incorporated herein by reference.

FIELD OF THE INVENTION

The present invention relates to wireless networks, and in particular, to the transmission of uncompressed video information in wireless communication networks.

BACKGROUND

According to the High-Definition Multimedia Interface (HDMI 1.4) Technical Specification, an HDMI Source (source) determines the pixel encoding and video format of a signal transmitted based on: the characteristics of the source video; the format and pixel encoding conversion possible at the source; and the format and pixel encoding capabilities and preferences of an HDMI Sink (sink). The video pixels transmitted across a wired link (cable) are in one of the three different pixel encodings: RGB 4:4:4, $YC_BC_R$ 4:4:4 or $YC_BC_R$ 4:2:2.

HDMI sources and sinks are capable of supporting RGB 4:4:4 pixel encoding. HDMI sources support either $YC_BC_R$ 4:4:4 or $YC_BC_R$ 4:2:2 pixel encoding whenever an HDMI source is capable of transmitting a color-difference color space across any other component (analog or digital video interface), except where the HDMI source would be required to convert RGB video to $YC_BC_R$. All HDMI sinks are capable of supporting both $YC_BC_R$ 4:4:4 and $YC_BC_R$ 4:2:2 pixel encoding when an HDMI sink is capable of supporting a color-difference color space from any other component analog or digital video input. If an HDMI sink supports either $YC_BC_R$ 4:4:4 or $YC_BC_R$ 4:2:2, then both are supported.

HDMI sources and sinks support color depth of 24 bits per pixel, but may support "Deep Color" 30, 36 and/or 48 bits per pixel. All Deep Color modes are optional though if an HDMI source or sink support any Deep Color mode, it supports a 36-bit mode. For each supported Deep Color mode, RGB 4:4:4 is supported and optionally $YC_BC_R$ YCBCR 4:4:4 may be supported. $YC_BC_R$ 4:2:2 is also a 36-bit mode. All HDMI sources do not send a Deep Color mode signal to a sink that does not indicate support for that mode.

BRIEF SUMMARY OF THE INVENTION

Embodiments of the invention provide a method and system for wireless transmission of video information. In one embodiment, a transmitting wireless station performs chroma partitioning of pixels in a video frame into different partitions. The chroma partitioning includes separating more important luminance (Y) information from less important chroma (i.e., chrominance) information $C_B$, $C_R$ of each pixel in a set of spatially correlated pixels. The Y information is placed into different partitions. The different partitions are placed into different packets and transmitted over a wireless communication medium to a receiving wireless station.

In one embodiment, chroma partitioning further comprises separating chrominance information ($C_B$ and $C_R$) for different pixels in said set of pixels. Further, partitioning includes performing rate adaptation by dropping one or more certain pixel partitions to achieve rate adaptation.

In one embodiment, the video information is adapted to a lower data transmission rate with reduced quality degradation by dropping less important partitions. One embodiment further includes performing progressive rate adaptation by gradually increasing the number of partitions to be dropped.

In one embodiment, chroma partitioning further comprises separating chrominance information ($C_B$ and $C_R$) of said different pixels for 4:4:4 to 4:2:2, and then further to 4:2:0 by subsampling. In one implementation, chroma partitioning includes performing chroma partitioning for different pixel encodings and color depths.

In one embodiment, more important video information comprising luminance (Y) information is transmitted using higher reliability wireless communication over the wireless communication medium, than less important video information comprising chrominance information ($C_B$ and $C_R$).

At the receiving wireless station, said partitions are recovered from the packets, and video frame pixels are reconstructed based on the recovered partitions. In one embodiment, the video information comprises uncompressed video information, and each video frame includes rows of pixels representing an image.

These and other features, aspects and advantages of the present invention will become understood with reference to the following description, appended claims and accompanying figures.

BRIEF DESCRIPTION OF THE DRAWINGS

FIGS. 2A-2B illustrate chroma partitioning for $YC_BC_R$ 4:2:2 (color depth=8) at a wireless transmitter and recovery of $YC_BC_R$ 4:2:2 (all color depths) at a wireless receiver, respectively, according to an embodiment of the invention.

FIG. 3B shows chroma partitioning for $YC_BC_R$ 4:2:0 (color depth=8) for odd video lines, respectively, according to an embodiment of the invention.

DESCRIPTION OF THE INVENTION

In one embodiment, the present invention provides a method and system for chroma partitioning and rate adaptation for wireless transmission of video transmission in wireless networks. In one embodiment, a transmitting wireless station performs chroma partitioning of pixels in a video frame into different partitions. The chroma partitioning includes separating more important luminance (Y) information from less important chroma (i.e., chrominance) information $C_B$, $C_R$ of each pixel in a set of spatially correlated pixels. The Y information is placed into different partitions. The different partitions are placed into different packets and transmitted over a wireless communication medium to a receiving wireless station.

Figure 1:
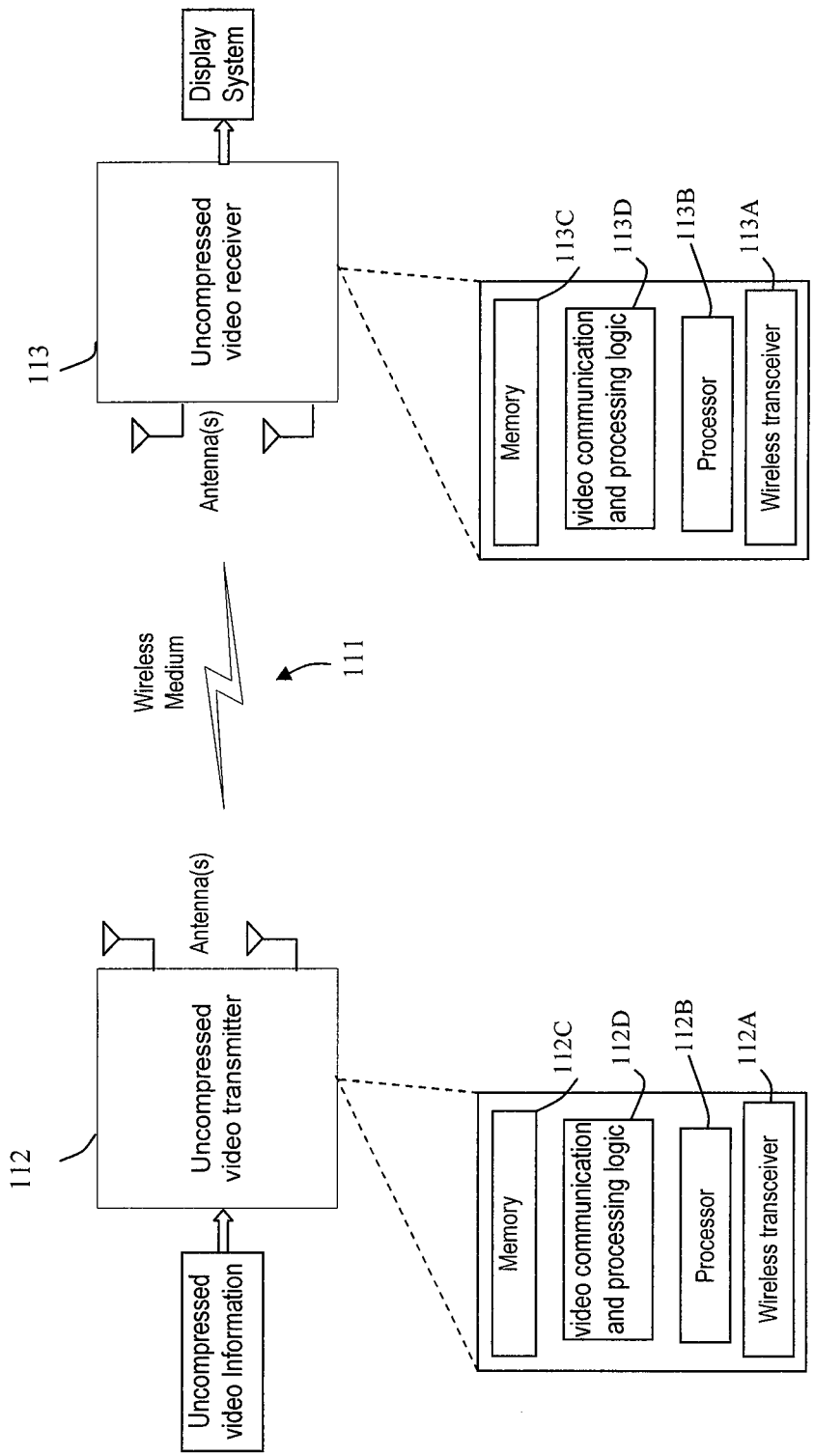
FIG. 1 shows a block diagram of a wireless communication system implementing chroma partitioning and rate adaptation for transmission of video information, according to an embodiment of the invention.

FIG. 1 shows a wireless communication network 100 comprising a transmitting wireless station (e.g., wireless transmitter) 112 and a receiving wireless station (e.g., wireless receiver) 113, implementing chroma partitioning and rate adaptation for uncompressed video transmission, according to an embodiment of the invention. In one embodiment, the wireless system 100 is configured for wireless transmission of uncompressed video over a wireless communication medium 111, such as a radio frequency (RF), from the transmitting wireless station 112 to the receiving wireless station 113, according to an embodiment of the invention.

In one embodiment, the transmitting wireless station 112 comprises a wireless communication module such as a wireless transceiver 112A, a processor 112B, memory 112C, and video communication and processing logic 112D. The logic 112D implements a chroma partitioning processes according to embodiments of the invention described herein. The receiving wireless station 113 comprises similar components as that of the transmitting wireless station 112. The receiving wireless station 113 includes a communication module such as a wireless transceiver 113A, a processor 113B, memory 113C, and video communication and processing logic 113D. The logic 113D implements video recovery processes according to embodiments of the invention described herein.

In one embodiment, a video frame includes rows of pixels representing an image. In one embodiment of the invention, chroma partitioning includes separating more important luminance (Y) information from less important Chrominance information ($C_B$ and $C_R$) of different pixels, and placing such luminance (Y) information into different partitions. In addition, Chrominance information ($C_B$ and $C_R$) for different pixels are also separated such that 4:4:4 to 4:2:2, and further to 4:2:0 subsampling is performed. The partitions of the video frame are then wirelessly transmitted from the transmitter to the receiver in packets where they are recovered (de-partitioned) for reconstructing the video frame.

Chroma sampling involves encoding images using less resolution for chroma information than for luma information, such as J:a:b wherein J is horizontal sampling reference, a is number of chrominance samples ($C_R$, $C_B$) in the first row of J pixels, and b is number of (additional) chrominance samples ($C_R$, $C_B$) in the second row of J pixels. Luma is the weighted sum of gamma-compressed R'G'B' components of a color video, wherein the prime symbols (') denote gamma-compression. Luminance (Y) is formed as a weighted sum of linear RGB components.

According to embodiments of the invention, more important luminance (Y) video information is transmitted using higher reliability wireless transmission over a wireless communication medium between the wireless transmitter and the wireless receiver, than less important Chrominance information ($C_B$ and $C_R$). According to embodiments of the invention, a video stream comprising video frames is adapted to a lower data transmission rate with reduced quality degradation by dropping less important partitions. According to an embodiment of the invention, rate adaptation is achieved by dropping one or more partitions for a pixel. Progressive rate adaptation can be achieved by gradually increasing the number of partitions to be dropped.

Figure 12:
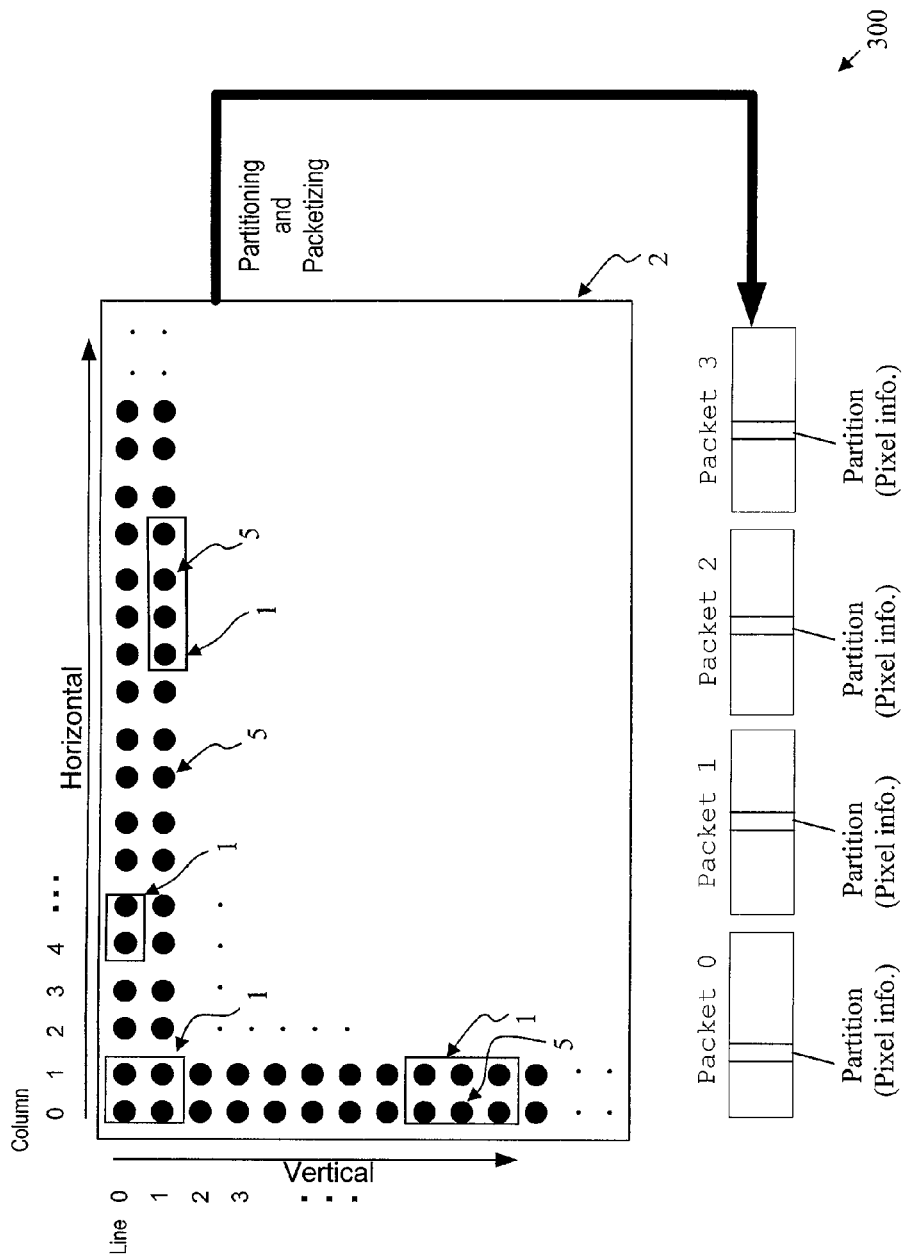
FIG. 12 illustrates an example partitioning application at a wireless transmitter for partitioning pixel information in a frame of pixels, according to an embodiment of the invention.

Chroma partitioning for different pixel encodings and color depths according to the embodiments of the invention is described below. Color depth or bit depth is the number of bits used to represent the color of a single pixel in a video image. Generally, in the description herein, partitioning is implemented by a wireless transmitter (sender) device and recovery is performed by a wireless receiver (sink) device. Chroma partitioning comprises considering a block 1 of pixels (FIG. 12) in a two-dimensional video frame 2 at a time, wherein each video frame includes multiple lines (rows) of pixels (FIG. 12). The blocks 1 comprise rectangular or square n×m pixel blocks of various sizes in the video frame 2 (wherein n is an integer greater than zero that represents the number of lines/rows in a block, and m is an integer greater than zero representing the number of columns in a block). For example a 1×2 block includes two consecutive pixels on one video line. A 2×2 block includes four pixels in a square block in the video frame. A 1×4 block includes four consecutive pixels on a video line (row).

In FIGS. 1A-C through 9, and FIG. 12, pixels 5 on video lines are shown, wherein a solid circle represents a pixel 5, a circle 102 represents the Y component (luminance) of the pixel 5, a dashed circle 103 represents the $C_B$ component of the pixel 5, and a dotted circle 104 represents the $C_R$ component of the pixel 5. When an n×m pixel block contains more than one pixel row (n>1), even or odd rows in a block may have different Y and chroma distribution orders, as is illustrated in the 2×2 block mode case described further below.

1×2 Block Mode Chroma Partitioning Process

In one embodiment, according to a 1×2 block mode chroma partitioning process, in order to reduce the buffer requirement at the transmitter and/or the receiver, all Y information of a block comprising only two consecutive pixels in a video line is considered at a time, wherein Y and chroma components of the pixels are distributed to multiple partitions in different orders. Each Y or chroma component switches on octet boundaries in said block (i.e., 8-bit boundary of a block of pixels), however, generally there is no difference in the distribution between even or odd rows in a video frame (except for the 4:2:0 case).

In the following, example chroma partitioning for different pixel encodings and color depths is described according to embodiments of the invention.

$YC_BC_R$ 4:4:4 all color depths

Figure 1C:
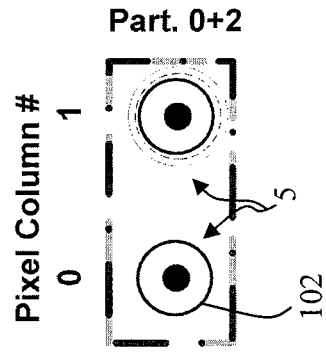
FIG. 1C illustrates recovery of $YC_BC_R$ at the wireless receiver when a partition is dropped, according to an embodiment of the invention.
Figure 1B:
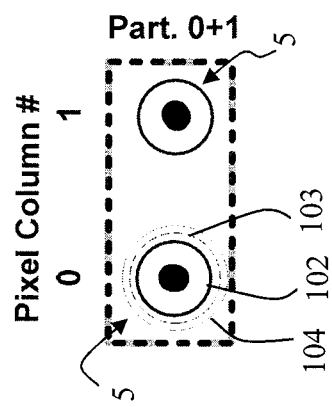
FIG. 1B illustrates recovery of $YC_BC_R$ 4:4:4 (all color depths) as $YC_BC_R$ 4:2:2 at a wireless receiver, according to an embodiment of the invention.
Figure 1A:
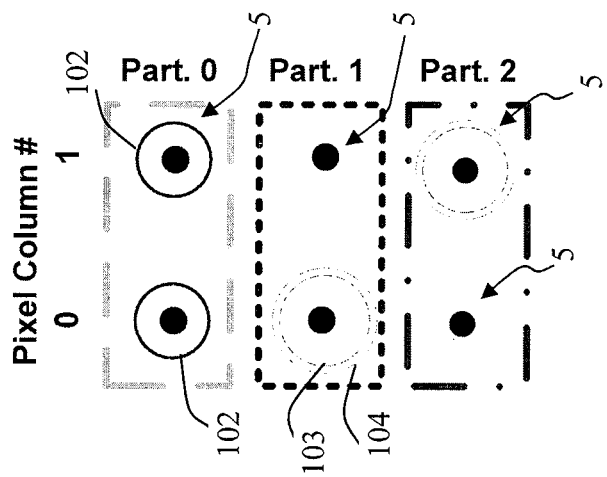
FIG. 1A illustrates chroma partitioning for $YC_BC_R$ 4:4:4 all color depths in a 1×2 block at a wireless transmitter, according to an embodiment of the invention.

Referring to the example partitioning in FIG. 1A, in one embodiment the present invention provides a chroma partitioning process for $YC_BC_R$ 4:4:4 all color depths in a 1×2 block, wherein there are only three partitions, namely Partition 0 (abbreviated as Part. 0), Partition 1 (abbreviated as Part. 1) and Partition 2 (abbreviated as Part. 2). FIG. 1A shows chroma partitioning for $YC_BC_R$ 4:4:4 (color depth=8) at the wireless transmitter. All Y information for each of the two pixels in the 1×2 block is concentrated in the Partition 0. Partition 1 includes $C_B$ and $C_R$ information of a first one of the two pixels (i.e., at column 0), and Partition 2 includes $C_B$ and $C_R$ information of a second one of the two pixels (i.e., at column 1), in the 1×2 block. Partition 0 has the highest level of importance. Partitions 1 and 2 have the same level of importance, which is less than that for Partition 0.

Without loss (or corruption) of any partition information during transmission from the transmitter to the receiver, a full uncompressed image is present at the receiver when the packets from the transmitter are received. With Partition 2 dropped (or lost in transmission), a 4:2:2 image is received at the receiver as shown in FIG. 1B. A copy of Partition 1 can be used as Partition 2 to recover $YC_BC_R$ 4:4:4 (all color depths) from $YC_BC_R$ 4:2:2 at the wireless receiver.

If Partition 1 is dropped (or lost) instead of Partition 2, a shift version of a 4:2:2 image is received at the receiver as shown in FIG. 1C. A copy of Partition 2 can be used as Partition 1 to recover $YC_BC_R$ 4:4:4 (all color depths) from shift version of a $YC_BC_R$ 4:2:2 image at the wireless receiver. In general, a copy of a received $C_BC_R$ partition may be used to re-construct $C_BC_R$ information of a lost partition. Further, error concealment may be applied such as by interpolation at the wireless receiver to correct for such loss.

$YC_BC_R$ 4:2:2 (color depth=8)

In one embodiment the present invention provides a chroma partitioning process for $YC_BC_R$ 4:2:2 (color depth=8) in a 1×2 block. FIG. 2A shows chroma partitioning for $YC_BC_R$ 4:2:2 (color depth=8) at a transmitter, wherein there are only two partitions (i.e., Partition 0 and Partition 1). All Y is concentrated in the Partition 0. The $C_B$ and $C_R$ information of the first pixel (i.e., pixel at column 0) is placed in Partition 1. Partitions 0 and 1 have the same level of importance. Without loss of any partition, a full uncompressed image is present at the receiver upon receipt of the transmitted packets. FIG. 2B shows recovery of $YC_BC_R$ 4:2:2 (all color depths) at a receiver, when both Partitions 0 and 1 are present at the receiver when the transmitted packets are received.

$YC_BC_R$ 4:2:0 (color depth=8)

Figure 3A:
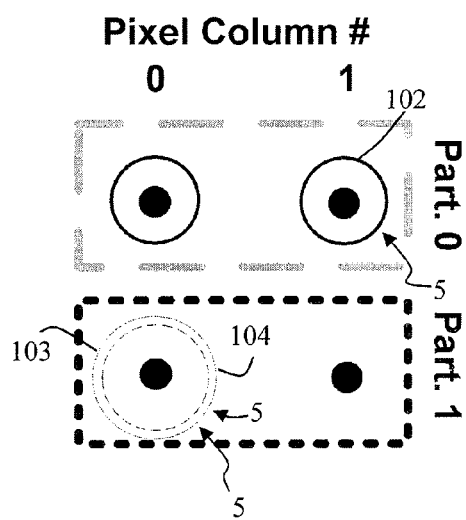
FIGS. 3A-3B illustrate chroma partitioning for $YC_BC_R$ 4:2:0 (color depth=8) for even lines.
Figure 3B:
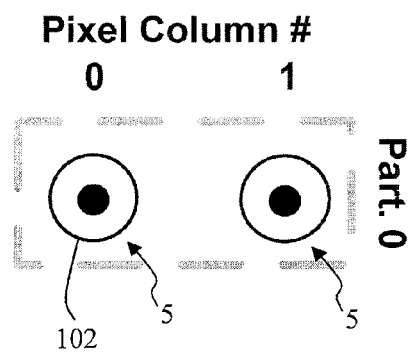

In one embodiment the present invention provides a chroma partitioning process for $YC_BC_R$ 4:2:0 (color depth=8) in a 1×2 block, wherein there are two partitions for even lines (FIG. 3A) and one partition for odd lines (FIG. 3B). FIG. 3A shows chroma partitioning for $YC_BC_R$ 4:2:0 (color depth=8) for even video lines. For even video lines, Partition 0 contains the Y information of all pixels in the 1×2 block. Partition 1 contains the $C_B$ and $C_R$ components of the even column pixels in the 1×2 block. In this case, Partitions 0 and 1 have the same level of importance.

FIG. 3B shows chroma partitioning for $YC_BC_R$ 4:2:0 (color depth=8) for odd video lines. For odd video line pixels, there is no Partition 1 (there is only Partition 0), and all Y is concentrated in the respective Partition 0 for even and odd column pixels. Without removal/loss of any partition, full uncompressed image is present at the receiver upon receiving transmitted packets.

Conversion Between Chroma Formats

In one embodiment, the present invention provides conversion between chroma formats. For $YC_BC_R$ 4:4:4 format, as shown in FIG. 1A, if either Partition 1 or 2 for each 1×2 block is dropped, the format becomes a $YC_BC_R$ 4:2:2 format and the data rate is reduced to ⅔ of the $YC_BC_R$ 4:4:4.

For $YC_BC_R$ 4:4:4 format, if either Partition 1 or 2 is dropped for each 1×2 pixel block in each even video line, and both Partitions 1 or 2 are dropped for each 1×2 pixel block in each odd video line, the format becomes the $YC_BC_R$ 4:2:0 format and the data rate is reduced to half of the $YC_BC_R$ 4:4:4.

Alternatively, for $YC_BC_R$ 4:4:4 format, if either Partition 1 or 2 is dropped for each 1×2 pixel block in each odd video line, and both Partitions 1 or 2 are dropped for each 1×2 pixel block in each even video line, the format also becomes $YC_BC_R$ 4:2:0 format and the data rate is reduced to half of the $YC_BC_R$ 4:4:4.

For $YC_BC_R$ 4:2:2 format, if all $C_BC_R$ partitions are dropped in each even video line but the $C_BC_R$ partition is kept in each odd video line, the format becomes $YC_BC_R$ 4:2:0 format and the data rate is reduced to ¾ of the $YC_BC_R$ 4:2:2.

According to the 1×2 block mode chroma partitioning process all Y information can be highly protected from transmission error using Unequal Error Protection (UEP) or a more robust transmission physical (PHY) modes or other techniques since a first partition (e.g., Partition 0) contains all Y information. This reduces buffering at the wireless transmitter (Tx) and the wireless receiver (Rx). The process further provides simplified format conversion, wherein for 1×2 block mode chroma partitioning, wherein:

All partitions present provides $YC_BC_R$ 4:4:4.
One of the last two partitions provides $YC_BC_R$ 4:2:2.
Partitions 2 or 1 dropped at even lines, and Partitions 1 and 2 dropped in odd lines provides $YC_BC_R$ 4:2:0.
Fine graularity in rate adpatation is provided.

1×4 Block Mode Chroma Partitioning Process

According to another embodiment of the invention, a block of only four consecutive pixels in a video line is considered at a time in a 1×4 block chroma partitioning process. The pixel Y and chroma components are distributed into multiple partitions in different orders. Each Y or chroma component switches on octet boundaries in a block (however, there is no difference in the distribution between even or odd rows (lines) in a video frame).

In the following, example chroma partitioning for different pixel encodings and color depths is described.

$YC_BC_R$ 4:4:4 all color depths

Figure 4:
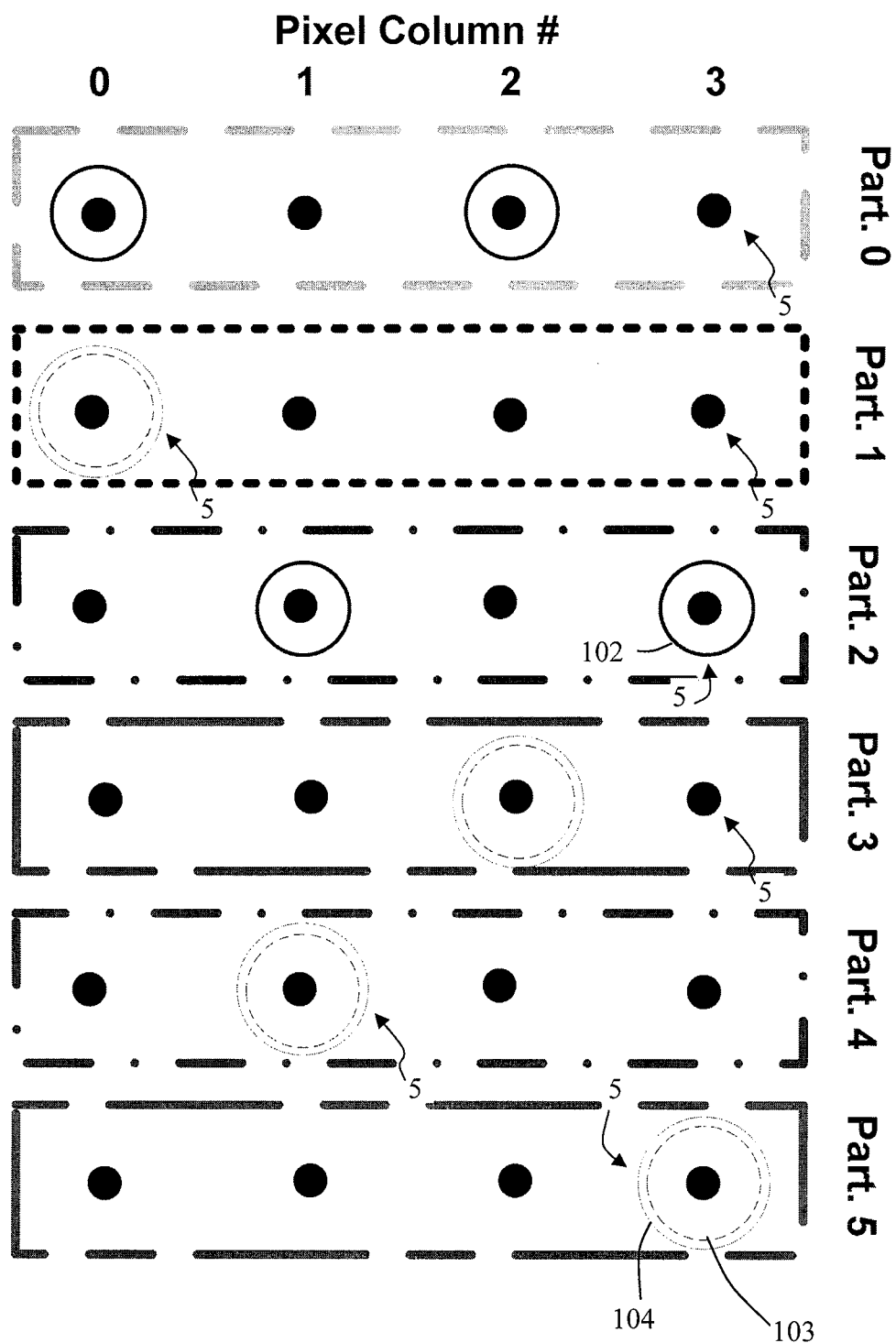
FIG. 4 illustrates chroma partitioning for $YC_BC_R$ 4:4:4 (all color depths) for a 1×4 block, according to an embodiment of the invention.

In one embodiment, the present invention provides a chroma partitioning process for $YC_BC_R$ 4:4:4 all color depths for a 1×4 block, wherein there are six partitions (i.e., Partition 0, Partition 1, Partition 2, Partition 3, Partition 4, Partition 5) as illustrated in FIG. 4. Y information for even column pixels (i.e., columns 0, 2) in said block is placed in a first partition (Partition 0). $C_B$ and $C_R$ information of a first one of the even column pixels (i.e., column 0) in said block is placed in a second partition (Partition 1). Y information for odd column pixels (i.e., columns 1, 3) in said block is placed in a third partition (Partition 2). $C_B$ and $C_R$ information of a second one of the even column pixels (i.e., column 2) in said block is placed in a fourth partition (Partition 3). $C_B$ and $C_R$ information of a first one of the odd column pixels (i.e., column 1) in said block is placed in a fifth partition (Partition 4). $C_B$ and $C_R$ information of a second one of the odd column pixels (i.e., column 3) in said block is placed in a sixth partition (Partition 5).

Partitions 0, 1 and 2 have a high level of importance and Partitions 3, 4 and 5 have a low level of importance. With Partitions 4 and 5 dropped, a 4:2:2 image is present at the receiver upon receiving transmitted packets. With Partitions 3, 4, and 5 dropped, a 4:1:1 image is present at the receiver upon receiving transmitted packets. Progressive rate adaptation can be achieved by gradually increasing the number of partitions to be dropped.

$YC_BC_R$ 4:2:2 (color depth=8)

Figure 5:
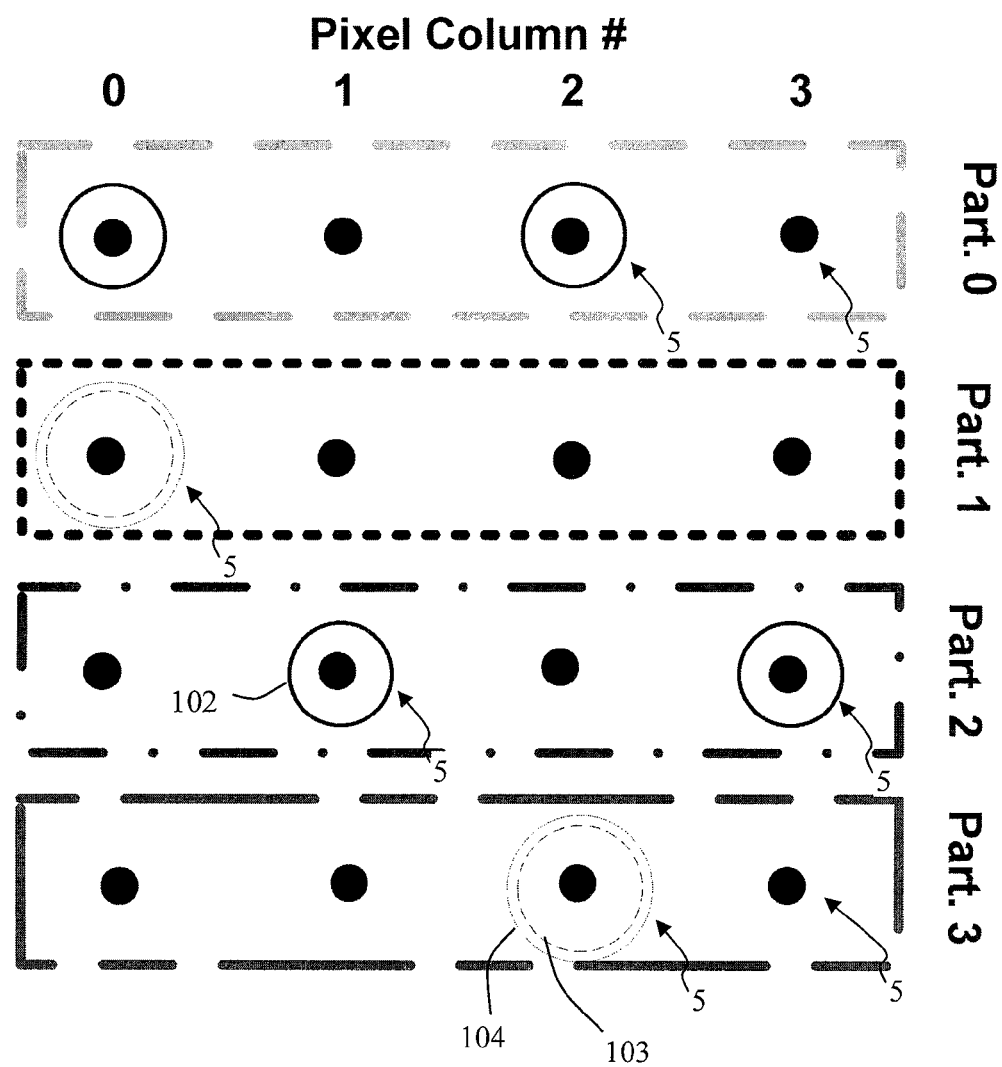
FIG. 5 illustrates chroma partitioning for $YC_BC_R$ 4:4:2 (color depth=8) for a 1×4 block, according to an embodiment of the invention.

In one embodiment, the present invention provides a chroma partitioning process for $YC_BC_R$ 4:2:2 (color depth=8) for a 1×4 block, wherein there are four partitions (i.e., Partition 0, Partition 1, Partition 2, Partition 3), as illustrated in FIG. 5. Y information for even column pixels (i.e., columns 0, 2) in said block is placed in a first partition (Partition 0). $C_B$ and $C_R$ information of a first one of the even column pixels (i.e., column 0) in said block is placed in a second partition (Partition 1). Y information for odd column pixels (i.e., columns 1, 3) in said block is placed in a third partition (Partition 2). $C_B$ and $C_R$ information of a second one of the even column pixels (i.e., column 2) in said block is placed in a fourth partition (Partition 3).

Partitions 0 and 1 have the highest level of importance, Partition 2 has a lower level of importance and Partition 3 has the lowest level of importance. With Partition 3 dropped, a 4:1:1 image is present at the receiver upon receiving transmitted packets. Progressive rate adaptation can be achieved by gradually increasing the number of partitions to be dropped.

$YC_BC_R$ 4:1:1 (color depth=8)

Figure 6:
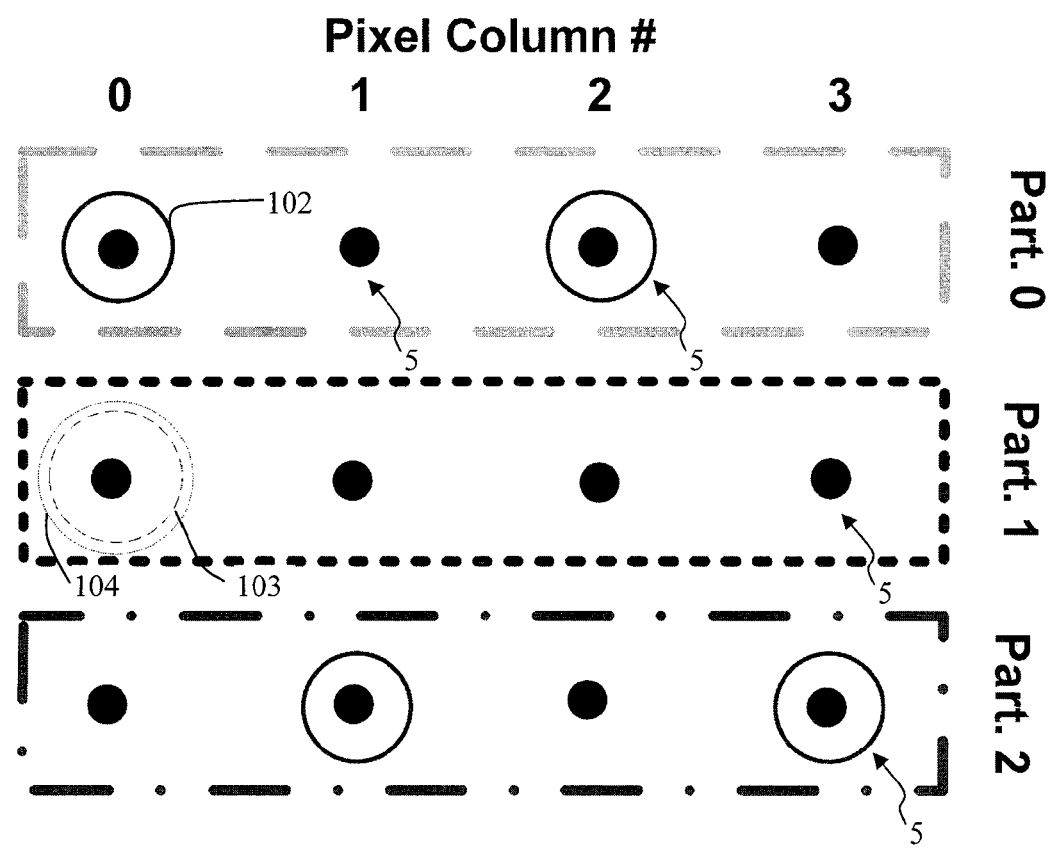
FIG. 6 illustrates chroma partitioning for $YC_BC_R$ 4:1:1 (color depth=8) for a 1×4 block, according to an embodiment of the invention.

In one embodiment, the present invention provides a chroma partitioning process for $YC_BC_R$ 4:1:1 (color depth=8) for a 1×4 block, wherein there are three partitions (Partition 1, Partition 2, Partition 3) as illustrated in FIG. 6. Y information for even column pixels (i.e., columns 0, 2) in said block is placed in a first partition (Partition 0). $C_B$ and $C_R$ information of a first one of the even column pixels (i.e., column 0) in said block is placed in a second partition (Partition 1). Y information for odd column pixels (i.e., columns 1, 3) in said block is placed in a third partition (Partition 2). Partitions 0 and 1 have a high level of importance and Partition 2 has a low level of importance.

According to the 1×4 block mode chroma partitioning process, all Y information can be highly protected from transmission error using UEP or via more robust transmission PHY layer modes or other techniques since Partition 0 contains all Y information. Partitioning is the same for odd and even video lines, and there is small buffer requirement for the transmitter and receiver. The process provides fine granularity in rate adapatation and is scalable, wherein for 1×4 block mode chroma partioning:

All partitions present, provides $YC_BC_R$ 4:4:4.
Partitions 4 and 5 dropped, provides $YC_BC_R$ 4:2:2.
Partitions 3, 4 and 5 dropped, provides $YC_BC_R$ 4:1:1.
Fine granularity in rate adapatation is provided.

2×2 Block Mode Chroma Partitioning Process

According to another embodiment of the invention, in a 2×2 block mode chroma partitioning process, a 2×2 block of only four pixels on two video lines is considered at a time. The pixel Y and chroma components are distributed to multiple partitions in different orders. Each Y or chroma component switches on octet boundaries (however, there is no difference in the distribution between even or odd rows in a video frame). In the following, chroma partitioning for different pixel encodings and color depths is illustrated.

$YC_BC_R$ 4:4:4 all color depths

Figure 7:
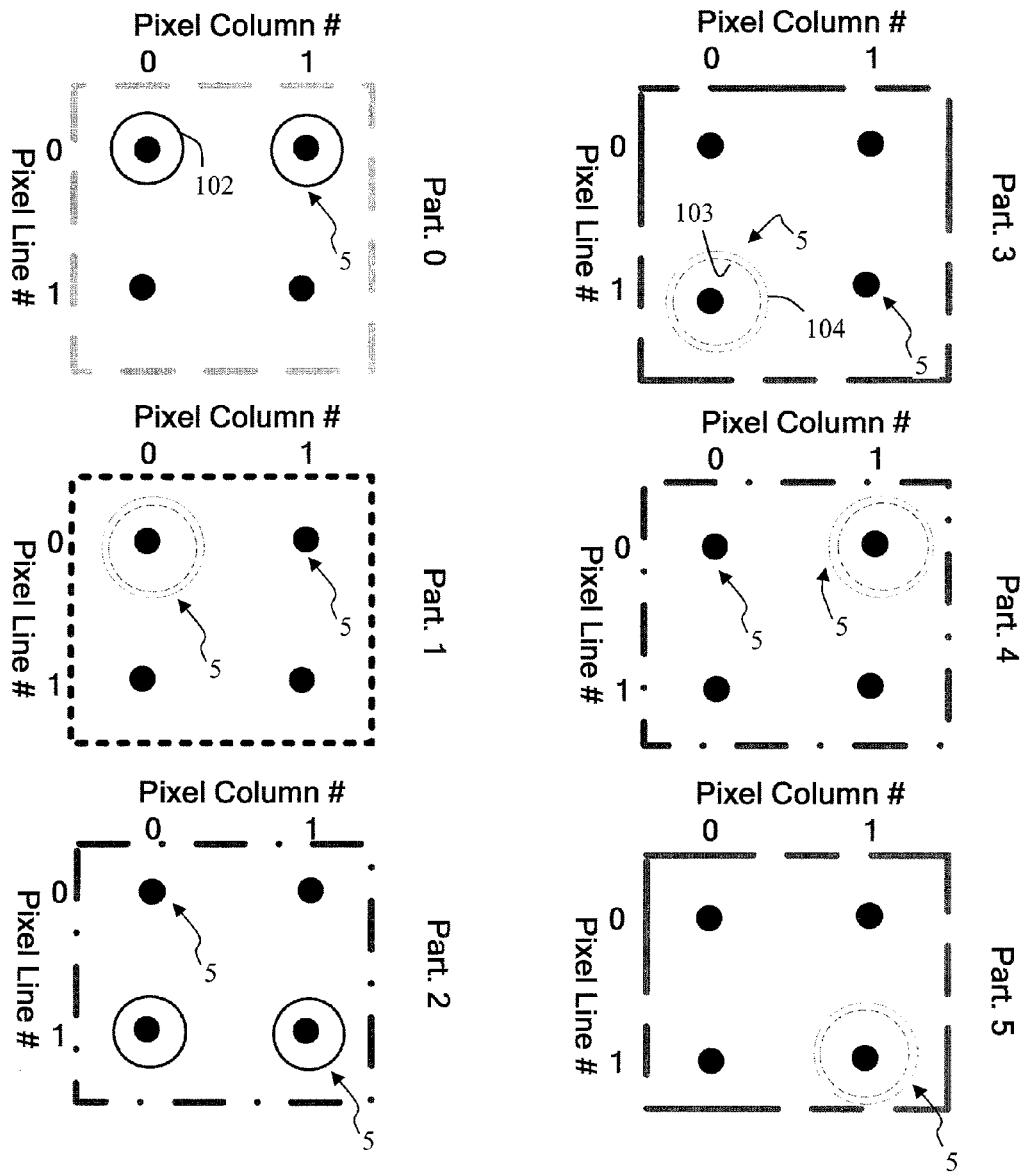
FIG. 7 illustrates chroma partitioning for $YC_BC_R$ 4:4:4 (all color depths) for a 2×2 block, according to an embodiment of the invention.

In one embodiment, the present invention provides a chroma partitioning process for $YC_BC_R$ 4:4:4 all color depths for a 2×2 block, wherein there are six partitions (i.e., Partition 0, Partition 1, Partition 2, Partition 3, Partition 4, Partition 5), as illustrated in FIG. 7. Y information for even line pixels (i.e., line 0) in said block is placed in a first partition (Partition 0). $C_B$ and $C_R$ information of a first even column pixel in a first even line (i.e., line 0, column 0) in said block is placed in a second partition (Partition 1). Y information for odd line pixels (i.e., line 1) in said block is placed in a third partition (Partition 2). $C_B$ and $C_R$ information of a first even column pixel in a first odd line (i.e., line 1, column 0) in said block is placed in a fourth partition (Partition 3). $C_B$ and $C_R$ information of a first odd column pixel in a first even line (i.e., line 0, column 1) in said block is placed in a fifth partition (Partition 4). $C_B$ and $C_R$ information of a first odd column pixel in a first odd line (i.e., line 1, column 1) in said block is placed in a sixth partition (Partition 5).

Partitions 0 and 1 have the highest level of importance, Partition 2 has a lower level of importance, Partition 3 has a further lower level of importance, and Partitions 4 and 5 have the lowest level of importance. With Partitions 4 and 5 dropped, a 4:2:2 image is present at the receiver upon receiving transmitted packets. With Partitions 3, 4, and 5 dropped, a 4:2:0 image is present at the receiver upon receiving transmitted packets. Without losing/dropping any partition, full uncompressed image is present at the receiver upon receiving transmitted packets. Progressive rate adaptation can be achieved by gradually increasing the number of partitions to be dropped.

$YC_BC_R$ 4:2:2 (color depth=8)

Figure 8:
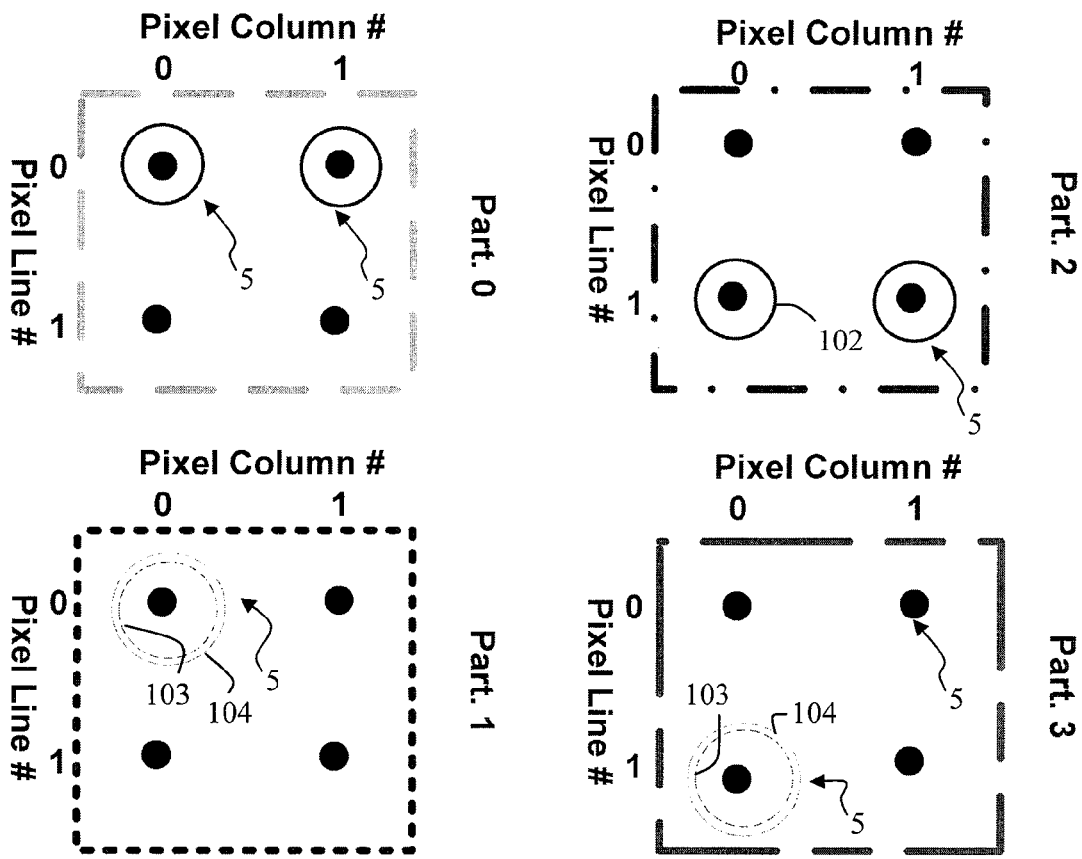
FIG. 8 illustrates chroma partitioning for $YC_BC_R$ 4:2:2 (color depth=8) for a 2×2 block, according to an embodiment of the invention.

In one embodiment, the present invention provides a chroma partitioning process for $YC_BC_R$ 4:2:2 (color depth=8) for a 2×2 block, wherein there are four partitions (i.e., Partition 0, Partition 1, Partition 2, Partition 3) as illustrated in FIG. 8. Y information for even line pixels (i.e., line 0) in said block is placed in a first partition (Partition 0). $C_B$ and $C_R$ information of a first even column pixel in a first even line (i.e., line 0, column 0) in said block is placed in a second partition (Partition 1). Y information for odd line pixels (i.e., line 1) in said block is placed in a third partition (Partition 2). $C_B$ and $C_R$ information of a first even column pixel in a first odd line (i.e., line 1, column 0) in said block is placed in a fourth partition (Partition 3). Partitions 0 and 1 have the highest level of importance, Partition 2 has a lower level of importance and Partition 3 has a lowest level of importance. With Partition 3 dropped, a 4:2:0 image is present at the receiver. Progressive rate adaptation can be achieved by gradually increasing the number of partitions to be dropped.

$YC_BC_R$ 4:2:0 (color depth=8)

Figure 9:
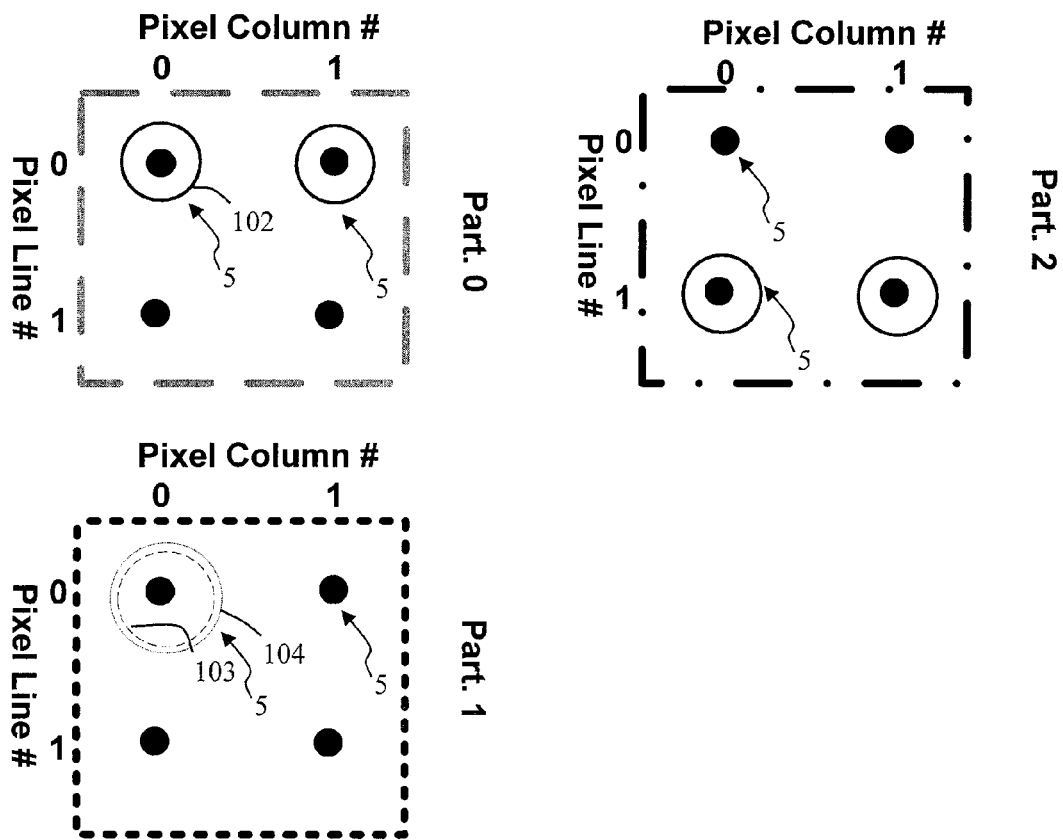
FIG. 9 illustrates chroma partitioning for $YC_BC_R$ 4:2:0 (color depth=8) for a 2×2 block, according to an embodiment of the invention.

In one embodiment, the present invention provides a chroma partitioning process for $YC_BC_R$ 4:2:0 (color depth=8) for a 2×2 block, wherein there are three partitions (i.e., Partition 0, Partition 1, Partition 2) as illustrated in FIG. 9. Y information for even line (i.e., line 0) pixels in said block is placed in a first partition (Partition 0). $C_B$ and $C_R$ information of a first even column pixel in a first even line (i.e., line 0, column 0) in said block is placed in a second partition (Partition 1). Y information for odd line pixels (i.e., line 1) in said block is placed in a third partition (Partition 2). Partitions 0 and 1 have a high level of importance and Partition 2 has a low level of importance.

According to the 2×2 block mode chroma partitioning process, Y information can be highly protected from transmission error using UEP or via more robust transmission PHY modes or other techniques since Partition 0 contains all Ys. Partitioning is the same for odd and even video lines. The process is scalable, wherein all partitions present provides $YC_BC_R$ 4:4:4, Partitions 4 and 5 dropped provides $YC_BC_R$ 4:2:2, Partitions 3, 4 and 5 dropped provides $YC_BC_R$ 4:2:0, and fine granularity in rate adapatation is provided.

As those skilled in the art will recognize, embodiments of the present invention are useful with other video formats similar to $YC_BC_R$ such as YCoCg 4:4:4, 4:2:2, 4:2:0, etc. Specifically, for YCoCg, Y is pseudo luminance, or intensity; Co is orange chrominance and Cg is green chrominance.

Example Implementation

Figure 10:
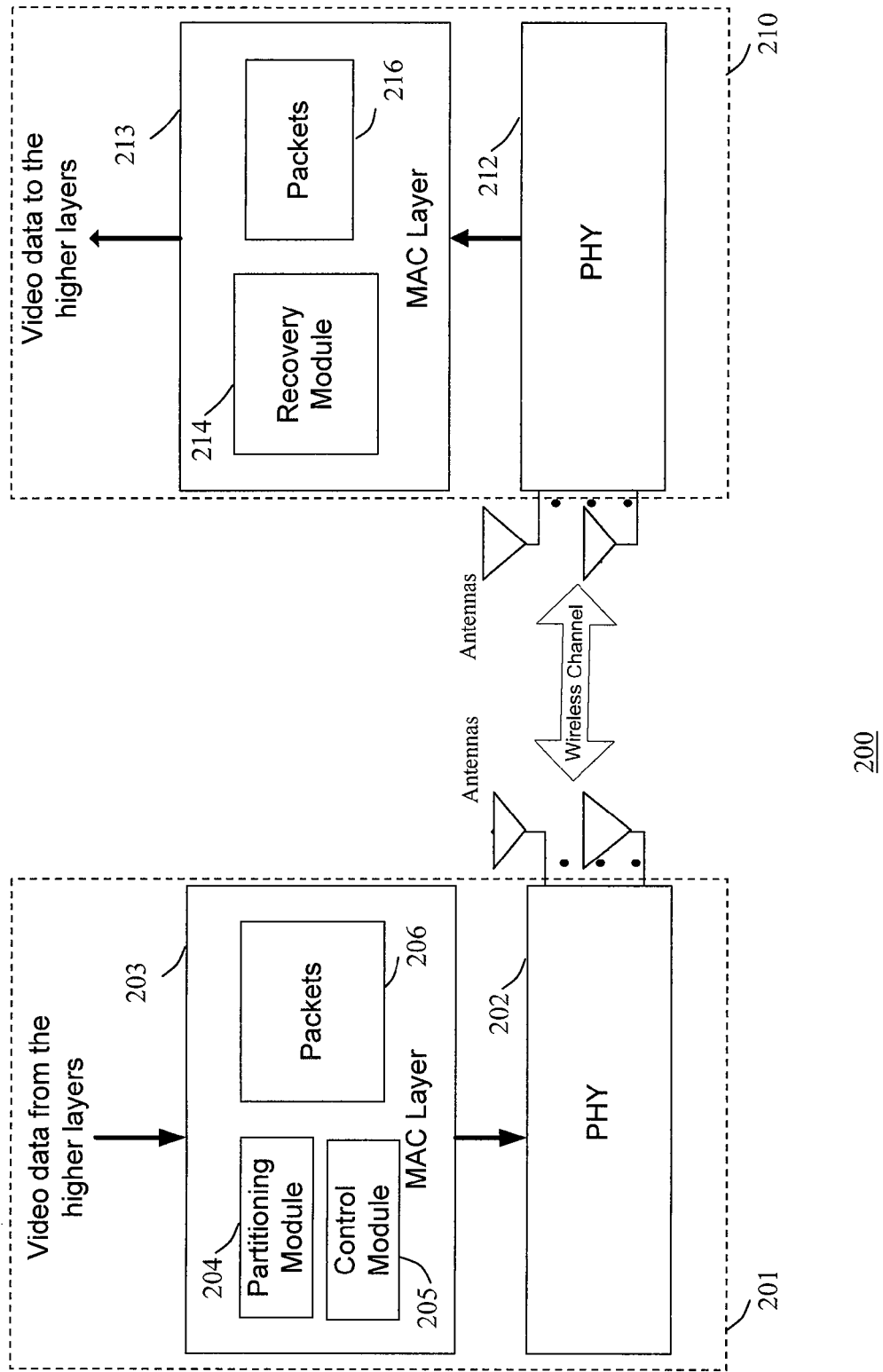
FIG. 10 shows a block diagram of a wireless network implementing chroma partitioning and rate adaptation for transmission of video information, according to an embodiment of the invention.

FIG. 10 shows a block diagram of a wireless communication system 200 including a transmitting wireless station (transmitter) 201 and a receiving wireless station (receiver) 210, implementing chroma partitioning and rate adaptation. The wireless system 200 is configured for wireless transmission of information comprising uncompressed video information (video data) over a wireless communication medium, such as millimeter wave or 60 GHz wireless medium (e.g., RF channel), between the transmitter 201 and the receiver 210.

In one example implementation of the system 200, the transmitter 201 and the receiver 210 form a wireless local area network implementing a frame structure for wireless communication such as in IEEE 802.11 standards for wireless local area networks (WLANs). The frame structure utilizes packet transmission in a Media Access Control (MAC) layer and a physical (PHY) PHY layer. In a transmitting wireless station, the MAC layer receives a data packet including payload data, and attaches a MAC header thereto, in order to construct a MAC Protocol Data Unit (MPDU). The MAC header includes information such as a source address (SA) and a destination address (DA). The MPDU is a part of a PHY Service Data Unit (PSDU) and is transferred to a PHY layer in the wireless station such as the transmitter to attach a PHY header (i.e., a PHY preamble) thereto to construct a PHY Protocol Data Unit (PPDU). The PHY header includes parameters for determining a transmission scheme including a coding/modulation scheme. Before transmission as a packet from the transmitter to the receiver, a preamble is attached to the PPDU, which may include channel estimation and synchronization information.

The transmitter 201 comprises a PHY layer 202 and a MAC layer 203. The receiver 210 comprises a PHY layer 212 and a MAC layer 213. The MAC layer 203 of the transmitter 201 comprises a partitioning module 204 including transmit video logic which implements video processing using chroma partitioning (e.g., partitioning of video frames into partitions and forming data payloads of packets 206 for transmission to the receiver), according to the invention as described herein. Similarly, the MAC layer 213 of the receiver 210 comprises a recovery module 214 including receiver video logic module which implements video processing using recovery (e.g., de-partitioning of partitions in the data payload packets 216 received from the transmitter), according to the invention as described herein. The example wireless stations 201, 210 are capable of performing directional communication such as by antenna training and beamforming, in the 60 GHz RF band, according to embodiments of the invention.

In one embodiment, a control module 205 performs rate adaptation and/or progressive rate adaptation (i.e., determines/selects which partitions to drop and when) before transmission. In one embodiment, the control module 205 comprises a priority queue implemented in the MAC layer for receiving partitioned packets, wherein the packets are placed in different priority categories. In another embodiment, the control module 205 comprises a scheduler that decides which packets to drop depending on a priority. In general, Y (luminance) components are more important and highly prioritized in relation to chroma components for uncompressed video transmission.

Figure 11:
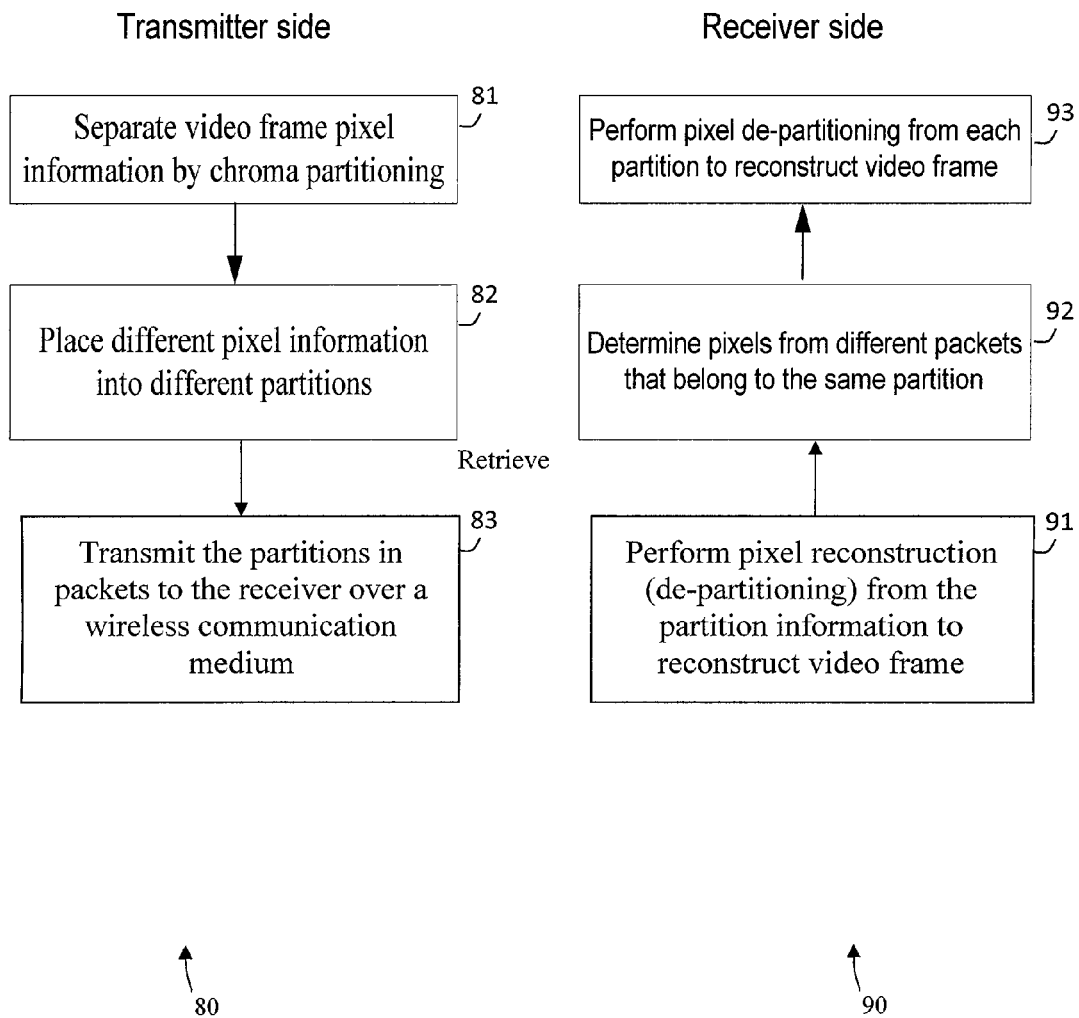
FIG. 11 shows a flowchart of a process for video frame pixel partitioning at a wireless transmitter and recovery at a wireless receiver, according to an embodiment of the invention.

FIG. 11 shows flowcharts of example processes for video frame pixel partitioning at the wireless transmitter 201 and recovery (de-partitioning) at the wireless receiver 210, according to an embodiment of the invention. A partitioning process 80 at the wireless transmitter 201 comprises the following processing blocks:

Block 81: Separate video frame pixel information by chroma partitioning, comprising separating more important luminance (Y) information from less important Chrominance information ($C_B$ and $C_R$) of different pixels.

Block 82: Place different pixel information into different partitions (e.g., place luminance (Y) information into different partitions). In one embodiment, Y information of a pixel may be placed into a different partition than Y information of another pixel depending on the partitioning scheme utilized. For example, in FIG. 4, Y information of certain pixels are placed in a different partition than Y information of other pixels. In one embodiment, Chrominance information ($C_B$ and $C_R$) of a pixel is placed in a separate partition than Y information of the same pixel.

Block 83: Transmit the partitions in packets to the receiver over a wireless communication medium. In one embodiment, each partition is packetized separately to provide different levels of protection and to facilitate recovery when packet drops occur.

In one example, one or more of the processing blocks 81 through 83 are implemented by the partitioning module 204 of the MAC layer 203 of the transmitter 201. In another embodiment, one or more of the processing blocks 81 through 83 are implemented in a higher layer (e.g., a video processing application layer) of the transmitter 201.

Referring back to FIG. 10, in another example, a recovery process 90 at the wireless receiver 210 comprises the following processing blocks:

Block 91: Retrieve partitions from each received packet.

Block 92: Determine information from different partitions that belong to at least a pixel based on the partitioning scheme utilized at the transmitter. The receiver has information about partitioning scheme utilized by the transmitter and uses a de-partitioning scheme which is the reverse of that used by the transmitter to recover corresponding Y, $C_B$, $C_R$ data to reconstruct a pixel, as those skilled in the art will recognize. The information is shared between transmitter and receiver using a video packet header or exchange of control messages, for example.

Block 93: Perform pixel reconstruction (de-partitioning) from the partition information to reconstruct video frame. In one embodiment, a pixel is reconstructed by collecting the Y, $C_B$, $C_R$ components of the pixel from the corresponding received partitions based on the partitioning scheme used by the transmitter (e.g., FIG. 1B). For example, if a partition is selectively dropped (or lost during transmission) a shift version of an image maybe recovered by using the Y components and right shifted Chroma components. Further, error concealment may be applied such as by interpolation at the receiver to correct for such loss. Other recovery and error concealment processes may be utilized based on the partitioning scheme, as those skilled in the art will recognize For example, in FIG. 7, if Partition 5 is lost, either received Partition 3 or 4 can be copied to re-construct Partition 5, or the average value of Partition 3 or 4 can be used to re-construct Partition 5.

In one example, one or more of the processing blocks 91 through 93 are implemented by the recovery module 214 of the MAC layer 213 of the receiver 210. In another embodiment, one or more of the processing blocks 91 through 93 are implemented in a higher layer (e.g., video processing application layer) of the receiver 210.

FIG. 12 shows an example process 300 at the transmitter 201, including partitioning pixel information in a frame 2 of pixels 5. The frame 2 includes multiple rows (lines) of pixels arranges in columns. The video lines of pixels are numbered in even/odd fashion (i.e., line 0, 1, 2, 3, . . . ). Similarly, the video columns of pixels are numbered in even/odd fashion (i.e., column 0, 1, 2, 3, . . . ). The partitions are then placed in packets in a packetization process for transmission to the receiver 210. In one example, packet 0 includes partition 0 of a first pixel block, followed by partition 0 of a second pixel block, etc. Further, packet 1 includes partition 1 of the first pixel block, followed by partition 1 of the second pixel block, etc. Further, packet 2 includes partition 2 of the first pixel block, followed by partition 2 of the second pixel block, etc. And, so on.

According to embodiments of the invention, removing one or more partitions for components of a pixel at the transmitter before transmission of packets allows adaptation to available or desired transmission rates over the wireless communication medium. Further, in case partitions are dropped at the transmitter or lost/corrupted during transmission, the receiver can recover pixel information using recovery processes described herein.

As is known to those skilled in the art, the aforementioned example architectures described above, according to the present invention, can be implemented in many ways, such as program instructions for execution by a processor, as software modules, microcode, as computer program product on computer readable media, as logic circuits, as application specific integrated circuits, as firmware, etc. The embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer, processing device, or any instruction execution system. For the purposes of this description, a computer-usable or computer readable medium can be any apparatus that can contain, store, communicate, or transport the program for use by or in connection with the instruction execution system, apparatus, or device. The medium can be electronic, magnetic, optical, or a semiconductor system (or apparatus or device).

Examples of a computer-readable medium include, but are not limited to, a semiconductor or solid state memory, magnetic tape, a removable computer diskette, a RAM, a read-only memory (ROM), a rigid magnetic disk, an optical disk, etc. Current examples of optical disks include compact disk-read-only memory (CD-ROM), compact disk-read/write (CD-R/W) and DVD.

I/O devices (including but not limited to keyboards, displays, pointing devices, etc.) can be connected to the system either directly or through intervening controllers. Network adapters may also be connected to the system to enable the data processing system to become connected to other data processing systems or remote printers or storage devices through intervening private or public networks. Modems, cable modem and Ethernet cards are just a few of the currently available types of network adapters. In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

The terms "computer program medium," "computer usable medium," "computer readable medium," and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information, from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer programs (also called computer control logic) are stored in main memory and/or secondary memory. Computer programs may also be received via a communications interface. Such computer programs, when executed, enable the computer system to perform the features of the present invention as discussed herein. In particular, the computer programs, when executed, enable the processor or multi-core processor to perform the features of the computer system. Accordingly, such computer programs represent controllers of the computer system.

Generally, the term "computer-readable medium", as used herein, refers to any medium that participated in providing instructions to a processor for execution. Such a medium may take many forms, including but not limited to, non-volatile media, and volatile media. Non-volatile media includes, for example, optical or magnetic disks, such as a storage device. Volatile media includes dynamic memory, such as a main memory.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of wireless transmission of video information, comprising:
    in a transmitting wireless station, chroma partitioning pixels in a video frame into different partitions, wherein chroma partitioning includes separating luminance (Y) information from chrominance ($C_B$ and $C_R$) information of each pixel in a set of spatially correlated pixels, and placing the Y information and the $C_B$ and $C_R$ information into different partitions in different orders, wherein one or more of the Y information, and the $C_B$ and $C_R$ information switches on octet boundaries;
    placing the different partitions into packets; and
    transmitting each packet over a wireless communication medium to a receiving wireless station.

2. The method of claim 1, wherein:
    chroma partitioning further comprises separating the $C_B$ and $C_R$ information for different pixels in said set of pixels; and
    placing the different partitions into packets comprises placing the different partitions into different packets.

3. The method of claim 2, wherein partitioning further includes performing rate adaptation by selectively dropping one or more pixel partitions before transmission.

4. The method of claim 3, further comprising:
    adapting the video information to a lower data transmission rate with reduced quality degradation by dropping less important partitions before transmission.

5. The method of claim 3, further comprising:
    performing progressive rate adaptation by gradually increasing the number of partitions to be dropped before transmission.

6. The method of claim 2, wherein:
    chroma partitioning further comprises separating the $C_B$ and $C_R$ information of said different pixels for 4:4:4 to 4:2:2, and further to 4:2:0 by subsampling.

7. The method of claim 6, further comprising:
    performing chroma partitioning for different pixel encodings and color depths.

8. The method of claim 7, wherein:
    chroma partitioning further comprises performing chroma partitioning on a 1×2 block of video pixels comprising two consecutive pixels in a video line.

9. The method of claim 8, wherein:
    chroma partitioning further comprises performing chroma partitioning for $YC_BC_R$ 4:4:4 all color depths in said 1×2 block of video pixels for generating three partitions, such that all Y information for the pixels in said block is placed in a first partition, $C_B$ and $C_R$ information of a first one of the two pixels in said block is placed in a second partition, and $C_B$ and $C_R$ information of a second one of the two pixels in said block is placed in a third partition, wherein the first partition has the highest level of importance.

10. The method of claim 8, wherein:
    chroma partitioning further comprises performing chroma partitioning for $YC_BC_R$ 4:2:2, color depth 8, in said 1×2 block of video pixels for generating two partitions, such that all Y information for the pixels in said block is placed in a first partition, and $C_B$ and $C_R$ information of a first one of the two pixels in said block is placed in a second partition, wherein the two partitions have the highest level of importance.

11. The method of claim 8, wherein:
    chroma partitioning further comprises performing chroma partitioning for $YC_BC_R$ 4:2:0, color depth 8, in said 1×2 block of video pixels for generating two partitions for even video lines and a partition for odd video lines, such that:
        for even video lines in said block, Y information for the pixels in said block is placed in a first partition, and $C_B$ and $C_R$ information for even column pixels in said block is placed in a second partition, wherein the two partitions have the same level of importance; and
        for odd video lines in said block, Y information for the pixels in said block is placed in a first partition.

12. The method of claim 7, wherein:
    chroma partitioning further comprises performing chroma partitioning on a 1×4 block of video pixels comprising four consecutive pixels in a video line, wherein Y and CB and CR information of the pixels are distributed to multiple partitions in different orders, and wherein each Y or CB and CR information switches on octet boundaries in said block.

13. The method of claim 12, wherein:
    chroma partitioning further comprises performing chroma partitioning for $YC_BC_R$ 4:4:4 all color depths in said 1×4 block of video pixels for generating six partitions, such that:
        Y information for even column pixels in said block is placed in a first partition;
        $C_B$ and $C_R$ information of a first one of the even column pixels in said block is placed in a second partition;
        Y information for odd column pixels in said block is placed in a third partition;
        $C_B$ and $C_R$ information of a second one of the even column pixels in said block is placed in a fourth partition;
        $C_B$ and $C_R$ information of a first one of the odd column pixels in said block is placed in a fifth partition; and
        $C_B$ and $C_R$ information of a second one of the odd column pixels in said block is placed in a sixth partition;
    wherein the first three partitions have a higher level of importance than the second three partitions.

14. The method of claim 12, wherein:
    chroma partitioning further comprises performing chroma partitioning for $YC_BC_R$ 4:2:2, color depth 8, in said 1×4 block of video pixels for generating four partitions, such that:
        Y information for even column pixels in said block is placed in a first partition;
        $C_B$ and $C_R$ information of a first one of the even column pixels in said block is placed in a second partition;
        Y information for odd column pixels in said block is placed in a third partition;
        $C_B$ and $C_R$ information of a second one of the even column pixels in said block is placed in a fourth partition;

wherein the first two partitions have a highest level of importance, and the third partition has a higher level of importance than the fourth partition.

15. The method of claim 12, wherein:
chroma partitioning further comprises performing chroma partitioning for $YC_BC_R$ 4:1:1, color depth 8, in said 1×4 block of video pixels for generating three partitions, such that:
Y information for even column pixels in said block is placed in a first partition;
$C_B$ and $C_R$ information of a first one of the even column pixels in said block is placed in a second partition; and
Y information for odd column pixels in said block is placed in a third partition;
wherein the first two partitions have a highest level of importance.

16. The method of claim 7, wherein:
chroma partitioning further comprises performing chroma partitioning on a 2×2 block of video pixels comprising four pixels on two video lines, wherein Y and CB and CR information of the pixels are distributed to multiple partitions in different orders, and wherein each Y or CB and CR information switches on octet boundaries in said block.

17. The method of claim 16, wherein:
chroma partitioning further comprises performing chroma partitioning for $YC_BC_R$ 4:4:4 all color depths in said 2×2 block of video pixels for generating six partitions, such that:
Y information for even line pixels in said block is placed in a first partition;
$C_B$ and $C_R$ information of a first even column pixel in a first even line in said block is placed in a second partition;
Y information for odd line pixels in said block is placed in a third partition;
$C_B$ and $C_R$ information of a first even column pixel in a first odd line in said block is placed in a fourth partition;
$C_B$ and $C_R$ information of a first odd column pixel in a first even line in said block is placed in a fifth partition; and
$C_B$ and $C_R$ information of a first odd column pixel in a first odd line in said block is placed in a sixth partition;
wherein the first two partitions have the highest level of importance.

18. The method of claim 16, wherein:
chroma partitioning further comprises performing chroma partitioning for $YC_BC_R$ 4:2:2, color depth 8, in said 2×2 block of video pixels for generating four partitions, such that:
Y information for even line pixels in said block is placed in a first partition;
$C_B$ and $C_R$ information of a first even column pixel in a first even line in said block is placed in a second partition;
Y information for odd line pixels in said block is placed in a third partition; and
$C_B$ and $C_R$ information of a first even column pixel in a first odd line in said block is placed in a fourth partition;
wherein the first two partitions have a highest level of importance.

19. The method of claim 16, wherein:
chroma partitioning further comprises performing chroma partitioning for $YC_BC_R$ 4:2:0, color depth 8, in said 2×2 block of video pixels for generating three partitions, such that:
Y information for even line pixels in said block is placed in a first partition;
$C_B$ and $C_R$ information of a first even column pixel in a first even line in said block is placed in a second partition; and
Y information for odd line pixels in said block is placed in a third partition;
wherein the first two partitions have the highest level of importance.

20. The method of claim 1, wherein:
the video information comprises uncompressed video information; and
each video frame includes rows of pixels representing an image.

21. The method of claim 1, further comprising:
transmitting video information comprising Y information using higher reliability wireless communication over the wireless communication medium, than video information comprising $C_B$ and $C_R$ information.

22. The method of claim 1, further comprising:
at the receiving wireless station, recovering said partitions from the packets; and
reconstructing video frame pixels based on the recovered partitions utilizing a reverse process of said chroma partitioning.

23. The method of claim 22, wherein:
partitioning further includes selectively dropping one or more pixel partitions before transmission; and
reconstructing video frame pixels at the receiver further comprises utilizing received partitions to reconstruct video frame pixels for dropped partitions.

24. The method of claim 1, wherein Y information, and $C_B$ and $C_R$ information of the pixels are distributed into multiple different partitions in the different orders.

25. The method of claim 24, wherein each Y information or $C_B$ and $C_R$ information switches on octet boundaries.

26. A wireless station, comprising:
a partitioning module configured for chroma partitioning pixels in a video frame into different partitions and placing the different partitions into packets, wherein chroma partitioning includes separating luminance (Y) information from chrominance ($C_B$ and $C_R$) information of each pixel in a set of spatially correlated pixels, and placing the Y information and the $C_B$ and $C_R$ information into different partitions in different orders, wherein one or more of the Y information, and the $C_B$ and $C_R$ information switches on octet boundaries; and
a physical layer configured for transmitting each packet over a wireless communication medium to a wireless receiving station.

27. The wireless station of claim 26, wherein the partitioning module is configured for chroma partitioning by separating $C_B$ and $C_R$ information for different pixels in said set of pixels; and
placing the different partitions into packets comprises placing the different partitions into different packets.

28. The wireless station of claim 27, further comprising a control module configured for rate adaptation by selectively dropping one or more pixel partitions before transmission.

29. The wireless station of claim 28, wherein the control module is configured for adapting the video information to a lower data transmission rate with reduced quality degradation by dropping less important partitions before transmission.

30. The wireless station of claim 28, wherein the control module is configured for performing progressive rate adaptation by gradually increasing the number of partitions to be dropped before transmission.

31. The wireless station of claim 27, wherein the partitioning module is configured for chroma partitioning by separating $C_B$ and $C_R$ information of said different pixels for 4:4:4 to 4:2:2, and further to 4:2:0 by subsampling.

32. The wireless station of claim 31, wherein the partitioning module is configured for performing chroma partitioning for different pixel encodings and color depths.

33. The wireless station of claim 32, wherein the partitioning module is configured for performing chroma partitioning on a 1×2 block of video pixels comprising two consecutive pixels in a video line, wherein Y and CB and CR information of the pixels are distributed into multiple partitions in different orders, and wherein each Y or CB and CR information switches on octet boundaries.

34. The wireless station of claim 33, wherein the partitioning module is configured for performing chroma partitioning for $YC_BC_R$ 4:4:4 all color depths in said 1×2 block of video pixels for generating three partitions, such that all Y information for the pixels in said block is placed in a first partition, $C_B$ and $C_R$ information of a first one of the two pixels in said block is placed in a second partition, and $C_B$ and $C_R$ information of a second one of the two pixels in said block is placed in a third partition, wherein the first partition has the highest level of importance.

35. The wireless station of claim 33, wherein the partitioning module is configured for performing chroma partitioning for $YC_BC_R$ 4:2:2, color depth 8, in said 1×2 block of video pixels for generating two partitions, such that all Y information for the pixels in said block is placed in a first partition, and $C_B$ and $C_R$ information of a first one of the two pixels in said block is placed in a second partition, wherein the two partitions have the highest level of importance.

36. The wireless station of claim 33, the partitioning module is configured for performing chroma partitioning for $YC_BC_R$ 4:2:2, color depth 8, in said 1×2 block of video pixels for generating two partitions for even video lines and a partition for odd video lines, such that:
for even video lines in said block, Y information for the pixels in said block is placed in a first partition and $C_B$ and $C_R$ information for even column pixels in said block is placed in a second partition, wherein the two partitions have the same level of importance; and
for odd video lines in said block, Y information for the pixels in said block is placed in a first partition.

37. The wireless station of claim 32, wherein the partitioning module is configured for performing chroma partitioning on a 1×4 block of video pixels comprising four consecutive pixels in a video line, wherein Y and CB and CR information of the pixels are distributed to multiple partitions in different orders, and wherein each Y or CB and CR information switches on octet boundaries in said block.

38. The wireless station of claim 37, wherein the partitioning module is configured for performing chroma partitioning for $YC_BC_R$ 4:4:4 all color depths in said 1×4 block of video pixels for generating six partitions, such that:
Y information for even column pixels in said block is placed in a first partition;
$C_B$ and $C_R$ information of a first one of the even column pixels in said block is placed in a second partition;
Y information for odd column pixels in said block is placed in a third partition;
$C_B$ and $C_R$ information of a second one of the even column pixels in said block is placed in a fourth partition;
$C_B$ and $C_R$ information of a first one of the odd column pixels in said block is placed in a fifth partition; and
$C_B$ and $C_R$ information of a second one of the odd column pixels in said block is placed in a sixth partition;
wherein the first three partitions have a higher level of importance than the second three partitions.

39. The wireless station of claim 37, wherein the partitioning module is configured for performing chroma partitioning for $YC_BC_R$ 4:2:2, color depth 8, in said 1×4 block of video pixels for generating four partitions, such that:
Y information for even column pixels in said block is placed in a first partition;
$C_B$ and $C_R$ information of a first one of the even column pixels in said block is placed in a second partition;
Y information for odd column pixels in said block is placed in a third partition;
$C_B$ and $C_R$ information of a second one of the even column pixels in said block is placed in a fourth partition;
wherein the first two partitions have a highest level of importance, and the third partition has a higher level of importance than the fourth partition.

40. The wireless station of claim 37, wherein the partitioning module is configured for performing chroma partitioning for $YC_BC_R$ 4:1:1, color depth 8, in said 1×4 block of video pixels for generating three partitions, such that:
Y information for even column pixels in said block is placed in a first partition;
$C_B$ and $C_R$ information of a first one of the even column pixels in said block is placed in a second partition; and
Y information for odd column pixels in said block is placed in a third partition;
wherein the first two partitions have a highest level of importance.

41. The wireless station of claim 32, wherein the partitioning module is configured for performing chroma partitioning on a 2×2 block of video pixels comprising four pixels on two video lines, wherein Y and CB and CR information of the pixels are distributed to multiple partitions in different orders, and wherein each Y or CB and CR information switches on octet boundaries in said block.

42. The wireless station of claim 41, wherein the partitioning module is configured for performing chroma partitioning for $YC_BC_R$ 4:4:4 all color depths in said 2×2 block of video pixels for generating six partitions, such that:
Y information for even line pixels in said block is placed in a first partition;
$C_B$ and $C_R$ information of a first even column pixel in a first even line in said block is placed in a second partition;
Y information for odd line pixels in said block is placed in a third partition;
$C_B$ and $C_R$ information of a first even column pixel in a first odd line in said block is placed in a fourth partition;
$C_B$ and $C_R$ information of a first odd column pixel in a first even line in said block is placed in a fifth partition; and
$C_B$ and $C_R$ information of a first odd column pixel in a first odd line in said block is placed in a sixth partition;
wherein the first two partitions have the highest level of importance.

43. The wireless station of claim 41, wherein the partitioning module is configured for performing chroma partitioning for $YC_BC_R$ 4:2:2, color depth 8, in said 2×2 block of video pixels for generating four partitions, such that:
Y information for even line pixels in said block is placed in a first partition;

$C_B$ and $C_R$ information of a first even column pixel in a first even line in said block is placed in a second partition;

Y information for odd line pixels in said block is placed in a third partition; and $C_B$ and $C_R$ information of a first even column pixel in a first odd line in said block is placed in a fourth partition;

wherein the first two partitions have the highest level of importance.

44. The wireless station of claim 41, wherein the partitioning module is configured for performing chroma partitioning for $YC_BC_R$ 4:2:0, color depth 8, in said 2×2 block of video pixels for generating three partitions, such that:

Y information for even line pixels in said block is placed in a first partition;

$C_B$ and $C_R$ information of a first even column pixel in a first even line in said block is placed in a second partition; and Y information for odd line pixels in said block is placed in a third partition;

wherein the first two partitions have the highest level of importance.

45. The wireless station of claim 26, wherein the video information comprises uncompressed video information, and each video frame includes rows of pixels representing an image.

46. The wireless station of claim 26, wherein video information comprising Y information is transmitted using higher reliability wireless communication over the wireless communication medium, than video information comprising $C_B$ and $C_R$ information.

47. A wireless communication system, comprising:

a transmitting wireless station comprising:

a partitioning module configured for chroma partitioning pixels in a video frame into different partitions and placing the different partitions into packets, wherein chroma partitioning includes separating luminance (Y) information from chrominance ($C_B$ and $C_R$) information of each pixel in a set of spatially correlated pixels, and placing the Y information and the $C_B$ and $C_R$ information into different partitions in different orders, wherein one or more of the Y information, and the $C_B$ and $C_R$ information switches on octet boundaries;

a physical layer configured for transmitting each packet over a wireless communication medium to a wireless receiving station; and the receiving wireless station comprising a recovery module configured for recovering said partitions from the packets, and reconstructing video frame pixels based on the recovered partitions utilizing a reverse process of said chroma partitioning.

48. The system of claim 47, wherein the recovery module is configured for reconstructing video frame pixels utilizing received partitions to reconstruct video frame pixels for dropped partitions.

49. The system of claim 48, further comprising a control module configured for rate adaptation by selectively dropping one or more pixel partitions before transmission, wherein the partitioning module is configured for chroma partitioning by separating $C_B$ and $C_R$ for different pixels in said set of pixels.

50. The system of claim 48, wherein the control module is configured for adapting the video information to a lower data transmission rate with reduced quality degradation by dropping less important partitions before transmission.

51. The system of claim 48, wherein the control module is configured for performing progressive rate adaptation by gradually increasing the number of partitions to be dropped before transmission.

52. The system of claim 48, wherein the partitioning module is configured for chroma partitioning by separating $C_B$ and $C_R$ of said different pixels for 4:4:4 to 4:2:2, and further to 4:2:0 by subsampling.

53. The system of claim 47, wherein:

the wireless communication medium comprises a millimeter wave radio frequency channel.

* * * * *